United States Patent
Holung et al.

(10) Patent No.: US 10,474,201 B1
(45) Date of Patent: Nov. 12, 2019

(54) ELECTRONIC APPARATUS HAVING AN ELEVATION MECHANISM AND METHOD USING THE SAME

(71) Applicant: Lenovo (Singapore) Pte. Ltd., New Tech Park (SG)

(72) Inventors: Joseph Anthony Holung, Wake Forest, NC (US); Chihui Chen, New Taipei (TW); Tin-Lup Wong, Chapel Hill, NC (US); Bouziane Yebka, Apex, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 15/959,656

(22) Filed: Apr. 23, 2018

(51) Int. Cl.
*G06F 1/16* (2006.01)

(52) U.S. Cl.
CPC ............ *G06F 1/166* (2013.01); *G06F 1/1616* (2013.01); *G06F 1/1637* (2013.01); *G06F 1/1662* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 5,168,427 A * | 12/1992 | Clancy | ...................... | B41J 5/10 |
| | | | | 361/679.12 |
| 5,490,037 A * | 2/1996 | Clancy | .................. | G06F 1/1616 |
| | | | | 361/679.08 |
| 5,534,891 A * | 7/1996 | Takano | .................. | G06F 1/1616 |
| | | | | 345/169 |
| 5,629,832 A * | 5/1997 | Sellers | ...................... | B41J 11/56 |
| | | | | 361/679.11 |
| 5,812,116 A * | 9/1998 | Malhi | .................... | G06F 1/1616 |
| | | | | 200/517 |
| 5,818,360 A * | 10/1998 | Chu | ...................... | G06F 1/1616 |
| | | | | 341/22 |
| 6,028,768 A * | 2/2000 | Cipolla | ................. | G06F 1/1616 |
| | | | | 361/679.12 |
| 6,064,564 A * | 5/2000 | Song | ..................... | G06F 1/1616 |
| | | | | 361/679.09 |
| 6,091,600 A * | 7/2000 | Jeong | .................... | G06F 1/1667 |
| | | | | 361/679.12 |
| 6,144,554 A * | 11/2000 | Mok | ..................... | G06F 1/1616 |
| | | | | 361/679.08 |

(Continued)

*Primary Examiner* — Xanthia C Cunningham
(74) *Attorney, Agent, or Firm* — Dean D. Small; The Small Patent Law Group, LLC

(57) ABSTRACT

An electronic apparatus includes a base subassembly and a display subassembly. A hinge is rotatably coupled to the base subassembly and the display subassembly. The hinge allows the base subassembly and the display subassembly to rotate about an operating axis to change a rotational orientation of the display subassembly relative to the base subassembly. An elevation mechanism is operatively coupled to the hinge. The elevation mechanism includes a support tray disposed in the base subassembly that holds the mechanical elements. The elevation mechanism is responsive to torque that changes the rotational orientation of the display subassembly such that the elevation mechanism lifts the support tray when the display subassembly is moved to an upright position and lowers the support tray when the display subassembly is moved to a closed position.

20 Claims, 10 Drawing Sheets

(56) References Cited

U.S. PATENT DOCUMENTS

| | | | | |
|---|---|---|---|---|
| 6,175,492 B1* | 1/2001 | Nobuchi | G06F 1/1616 | 361/679.08 |
| 6,762,931 B2* | 7/2004 | Chen | G06F 1/1616 | 292/163 |
| 6,816,365 B2* | 11/2004 | Hill | G06F 1/1616 | 341/22 |
| 6,853,543 B1* | 2/2005 | Moore | G06F 1/1667 | 361/679.12 |
| 7,630,195 B2* | 12/2009 | Lin | G06F 1/203 | 361/679.26 |
| 8,111,506 B2* | 2/2012 | Wang | H04M 1/0237 | 16/367 |
| 8,542,486 B2* | 9/2013 | Lin | G06F 1/203 | 174/547 |
| 9,100,470 B2* | 8/2015 | Walker | G06F 1/1616 | |
| 9,213,371 B2* | 12/2015 | Liu | G06F 1/1664 | |
| 9,402,323 B2* | 7/2016 | Osborne | H05K 5/0017 | |
| 9,490,087 B2* | 11/2016 | Krumpelman | H01H 13/14 | |
| 9,778,683 B2* | 10/2017 | Ho | G06F 1/1618 | |
| 9,785,195 B2* | 10/2017 | Amarilio | G06F 1/1618 | |
| 9,847,190 B1* | 12/2017 | Yang | G06F 1/1666 | |
| 9,934,916 B2 | 4/2018 | Tamura et al. | | |
| 2005/0245297 A1* | 11/2005 | Lee | H04M 1/0237 | 455/575.4 |
| 2010/0311477 A1* | 12/2010 | Walker | G06F 1/1616 | 455/575.3 |
| 2011/0304551 A1* | 12/2011 | Wei | G06F 1/1662 | 345/168 |
| 2014/0254123 A1* | 9/2014 | Osborne | H05K 5/0017 | 361/807 |
| 2014/0311880 A1* | 10/2014 | Krumpelman | H01H 13/14 | 200/5 A |
| 2015/0016039 A1* | 1/2015 | Oakley | G06F 1/1662 | 361/679.12 |
| 2015/0316959 A1* | 11/2015 | Senatori | G06F 1/1618 | 345/169 |
| 2015/0341030 A1* | 11/2015 | De Saulles | G06F 1/1616 | 341/32 |
| 2016/0161987 A1* | 6/2016 | Jacobs | G06F 1/1662 | 361/679.11 |
| 2017/0102741 A1 | 4/2017 | Kinoshita | | |

* cited by examiner

ELECTRONIC APPARATUS HAVING AN ELEVATION MECHANISM AND METHOD USING THE SAME

BACKGROUND

Embodiments of the present disclosure generally relate to electronic assemblies and more particularly to electronic assemblies that convert between a state in which an input device is exposed and a different state in which the input device is hidden.

A wide variety of portable electronic apparatuses are offered today including computers (e.g., laptop or tablet computers), electronic games, and the like. Laptop computers include a display chassis that can be opened and closed relative to a main chassis. The display chassis has a viewing side and an opposite cover side. The main chassis has an input side where an integrated keyboard is accessible to the user and an opposite bottom side that typically rests upon a surface during operation. When the laptop is in an inoperative mode (e.g., shut down or sleeping), the viewing side of the display chassis is positioned against the input side of the main chassis. In a conventional operating mode, the viewing side of the display chassis is typically positioned between 90° and 150° with respect to the input side so that the user has access to the keyboard. For convertible laptops that can also function in a table operating mode, the display chassis is rotated further away and folded against the body chassis. The user primarily interacts with a touch-sensitive screen of the display chassis.

A keyboard includes several keys that are arranged in a predetermined manner. For mechanical keyboards, the keys (or keycaps) are to be depressed into the main chassis. The keycaps are designed to move at least a certain distance so that the user knows the key has been activated. As such, the keyboard has a minimum thickness that accounts for the stroke distance of the key caps as well as for the circuitry and other mechanical components used by the laptop computer.

Some laptop computers are designed to move the key caps into the main chassis before the display chassis returns to a closed position in the inoperative mode. Moving the key caps into the main chassis may protect the screen and make the laptop computer easier to close. In one mechanism, a hidden wire frame extends across a covered surface of each of the key caps. The wire frame may be lowered as the display chassis is closed, thereby pressing the key caps into the body chassis.

This mechanism, however, may require a relatively large force. For instance, each key may require about 60 grams-force (gf) to push down. Some keyboards include 80 keycaps or more, which corresponds to 5 kilogram-force (kgf) to push the key caps down. It would be desirable to provide a mechanism for moving the key caps that requires less force than known mechanisms.

SUMMARY

In accordance with embodiments herein, an electronic apparatus is provided. The electronic apparatus comprises a base subassembly that has an input side. The base subassembly includes an input device that has an array of mechanical elements positioned along the input side. The mechanical elements are pressed. A display subassembly includes a display device that visually presents information. One or more processors and memory store program instructions accessible by the one or more processors. Responsive to execution of the program instructions, the processor presents information through the display device. A hinge is rotatably coupled to the base subassembly and the display subassembly. The hinge allows the base subassembly and the display subassembly to rotate about an operating axis to change a rotational orientation of the display subassembly relative to the base subassembly. An elevation mechanism is operatively coupled to the hinge. The elevation mechanism includes a support tray disposed in the base subassembly that holds the mechanical elements. The elevation mechanism is responsive to torque that changes the rotational orientation of the display subassembly such that the elevation mechanism lifts the support tray when the display subassembly is moved to an upright position and lowers the support tray when the display subassembly is moved to a closed position.

Optionally, the elevation mechanism may include a gear and a slider that may be operatively coupled to the gear. The gear may rotate as the rotational orientation of the display subassembly is changed. The gear may cause the slider to move as the gear rotates. The gear may be collinear with the operating axis such that the gear rotates about the operating axis. The gear may comprise a pinion. The elevation mechanism may further comprise a second gear that may operatively couple the pinion and the slider. The pinion may have a tip diameter that may be at most five (5) millimeters. The elevation mechanism may further comprise a linkage. The linkage may move the slider in a linear direction as the gear rotates.

Optionally, the linear direction may be a first linear direction. As the gear rotates at least 150° in one direction, the linkage may move the slider in the first linear direction and may move the slider in a second linear direction that may be opposite the first linear direction. The electronic apparatus may be a portable computer operable in a standard mode and in a tablet mode. The elevation mechanism may lower the support tray from an active elevation to a retracted elevation in response to the display subassembly being rotated from an opened position to a tablet position. The elevation mechanism may include a sensor and a motor operatively coupled to the sensor. The sensor may have a rotary encoder that may determine the rotational orientation of the display subassembly. The motor may lift or lower the support tray in response to the rotational orientation being changed.

In accordance with embodiments herein, an electronic apparatus is provided. The electronic apparatus comprises a cover subassembly, a base subassembly that has an input side and includes an input device that has an array of user-activatable mechanical elements positioned along the input side. A hinge is rotatably coupled to the base subassembly and the cover subassembly. The hinge allows the base subassembly and the cover subassembly to rotate about an operating axis to change a rotational orientation of the cover subassembly relative to the base subassembly. The cover subassembly covers the input side when the cover subassembly is in a closed position. An elevation mechanism is operatively coupled to the hinge. The elevation mechanism includes a support tray disposed in the base subassembly to hold the mechanical elements. The elevation mechanism is responsive to torque that changes the rotational orientation of the cover subassembly. The elevation mechanism lifts the support tray from a retracted elevation to an active elevation in response to the cover subassembly being moved to an opened position and lowers the support tray from the active elevation to a retracted elevation when the cover subassembly is moved to a closed position.

Optionally, the elevation mechanism may include a gear and a slider that may be operatively coupled to the gear. The gear may rotate as the rotational orientation of the display subassembly is changed. The gear may cause the slider to move as the gear rotates. The gear may comprise collinear with the operating axis such that the gear rotates about the operating axis. The gear may be a pinion. The elevation mechanism may further comprise a second gear that may operatively couple the pinion and the slider. The pinion may have a tip diameter that may be at most five (5) millimeters. The elevation mechanism may further comprise a linkage. The linkage may move the slider in a linear direction as the gear rotates.

Optionally, the linear direction may be a first linear direction. As the gear rotates at least 150° in one direction, the linkage may move the slider in the first linear direction and may move the slider in a second linear direction that is opposite the first linear direction. The electronic apparatus may be a portable computer operable in a standard mode and in a tablet mode. The elevation mechanism may lower the support tray from an active elevation to a retracted elevation in response to the display subassembly being rotated from an opened position to a tablet position. The elevation mechanism may include a sensor and a motor operatively coupled to the sensor. The sensor may have a rotary encoder that may determine the rotational orientation of the display subassembly. The motor may lift or lower the support tray in response to the rotational orientation being changed.

In accordance with embodiments herein, a method is provided. The method rotates a display subassembly of an electronic apparatus about an operating axis. The display subassembly is rotatably coupled to a base subassembly of the electronic apparatus. The base subassembly has a support tray holding user-activatable mechanical elements. The support tray is raised as the display subassembly is rotated from a closed position to an opened position. The support tray is lowered as the display subassembly is rotated from the opened position to the closed position. The support tray is lowered as the display subassembly is rotated from the opened position to the tablet position.

Optionally the method may further comprise moving a slider in a first linear direction or in a second linear direction as the display subassembly is rotated. The slider may raise or lower the support tray while moving in the first linear direction and in the second linear direction, respectively. The electronic apparatus may include a pinion that is collinear with the operating axis. The pinion may rotate as the display subassembly is rotated. The pinion may have a tip diameter that may be at most five (5) millimeters. The electronic apparatus may include a gear that may be operatively coupled to the pinion. As the gear rotates at least 150° in one direction, the support tray may be raised and lowered.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Figure 1:
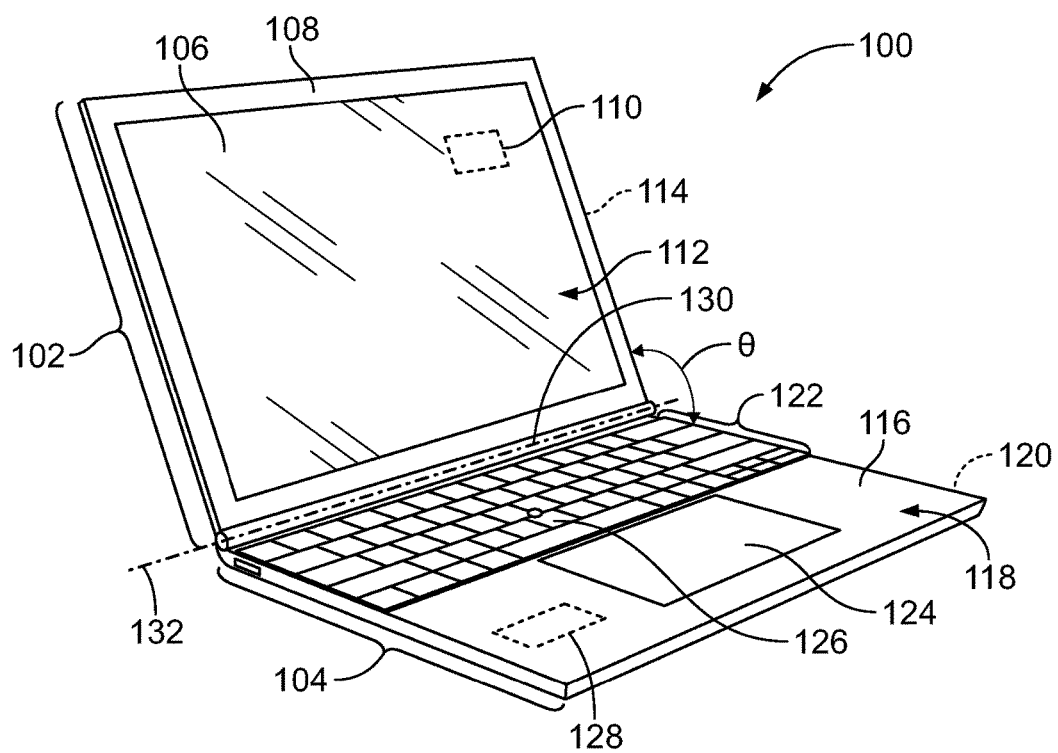
FIG. 1 illustrates a perspective view of an electronic apparatus formed in accordance with an embodiment described herein having a display subassembly (or cover subassembly) and a base subassembly.

FIG. 1 illustrates a perspective view of an electronic apparatus 100 formed in accordance with an embodiment described herein. In the illustrated embodiment, the electronic apparatus 100 is a portable computing device, such as a laptop computer. In particular embodiments, the electronic apparatus 100 is a convertible portable computer that is capable of operating in a standard operating mode and also in a tablet operating mode. The electronic apparatus 100 includes a display subassembly 102 and a base subassembly 104 that are coupled with each other in the state of the electronic apparatus 100 shown in FIG. 1. The display subassembly 102 includes a display device 106 and a housing 108 coupled with the display device 106. The display device 106 may be a touchscreen (e.g., touch-sensitive display) or non-touch sensitive display. The display device 106 visually presents information to a user of the electronic apparatus 100 or the display subassembly 102.

In alternative embodiments, a cover subassembly may replace the display subassembly 102. The cover subassembly covers (e.g., extend over) an input side to, for example, protect the input side. The cover subassembly may or may not include a display device. Alternatively or in addition to the display device, the cover subassembly may have user-activatable mechanical elements similar to the user-activatable elements described herein. For embodiments that include a cover subassembly, the base subassembly may include a display device. In such instances, the base subassembly may include the input device and the display device along a single side of the base subassembly.

As described herein, the electronic apparatus 100 may operate not only in a standard operating mode but also in a tablet operating mode. In the standard operating mode, the display subassembly 102 is oriented as shown in FIG. 1 in which the display subassembly 102 (or the display 106) is substantially upright and forms an angle 1 with respect to the base subassembly 104. For example, the angle 1 may be between 80° and 150°. In the tablet operating mode, the display subassembly 102 is positioned side-by-side with the base subassembly 104 such that the angle 1 is essentially 0°. For instance, a rear or non-display side 114 of the housing 108 may be positioned side-by-side with a back side 120 of the base subassembly 104. The operating mode may be changed by the user when a user applies torque to at least one of the display subassembly or base subassembly. In other embodiments, the housing 108 is rotatable such that the display 106 may be positioned side-by-side with the back side 120 of the base subassembly 104.

The housing 108 forms part of the exterior surface of the display subassembly 102. The display device 106 is disposed on a front or display side 112 of the housing 108. The housing 108 also includes the opposite rear side 114. One or more processors 110 may be disposed inside the housing 108 between the sides 112, 114. The processors 110 may receive input (e.g., from the display device 106 and/or other input devices) to control the information that is shown on the display device 106. The processors 110 can represent one or more microprocessors, integrated circuits, field programmable gate arrays, or the like.

The base subassembly 104 includes a housing 116 that couples with the housing 108 of the display subassembly 102. The housing 116 forms at least part of the exterior surface of the base subassembly 104. The housing 116 has an input side 118 and the opposite back side 120. One or more input devices 122, 124 are connected with the housing 116 and accessible to a user of the base subassembly 104 on or via the input side 118 of the housing 116. In the illustrated embodiment, the input device 122 is a keyboard having one or more keycaps 126 and the input device 124 is a touch sensitive surface (e.g., touch pad). The keycaps 126 may be depressed or otherwise actuated by a user and/or the input device 124 may be touched by the user to provide input to the electronic apparatus 100. Optionally, one or more other input devices may be included.

In one embodiment, the base subassembly 104 also includes one or more processors 128 in the housing 116. These processors 128 may be similar or identical to the processors 110 in the display subassembly 102. Alternatively, the processors 128 may have more processing capability (e.g., power) relative to the processors 110. The processors 110 and/or the processors 128 may receive signals from the input devices 122, 124 and/or the display device 106, and can control and/or perform operations based on or using these signals, such as by controlling the information presented on the display device 106.

The electronic apparatus 100 may operate as a laptop computer or other electronic device in the state shown in FIG. 1. This state may be referred to as an exposed state because the input devices 122, 124 are exposed and available for a user of the electronic apparatus 100 to actuate for providing input to the processors 110 and/or 128. The input devices 122, 124 are interposed between the display side 112 of the display subassembly 102 and the back side 120 of the base subassembly 104 in the exposed state. For example, the input devices 122, 124 are between the display side 112 of the display subassembly 102 and the back side 120 of the base subassembly 104 without the back side 114 of the display subassembly 102 also being between the display side 112 of the display subassembly 102 and the back side 120 of the base subassembly 104. This allows for both the display side 112, the display device 106, and the input devices 122, 124 to be concurrently or simultaneously visible and accessible to a user of the electronic apparatus 100.

The display subassembly 102 and the base subassembly 104 are connected with each other along an elongated connector assembly or hinge 130. This connection allows the display subassembly 102 and the base subassembly 104 to pivot relative to each other in directions around or about an operating axis 132 extending along the hinge 130. The operating axis 132 is hereinafter referred to as the operating axis 132. This hinge 130 provides for the ability to pivot the display and base subassemblies 102, 104 relative to each other to a variety of angles (as shown and described below in connection with FIG. 3), to maintain the orientation of the display and base subassemblies 102, 104 relative to each other, and/or to transfer data and/or electrical power (e.g., current) between the display and base subassemblies 102, 104.

Figure 2:
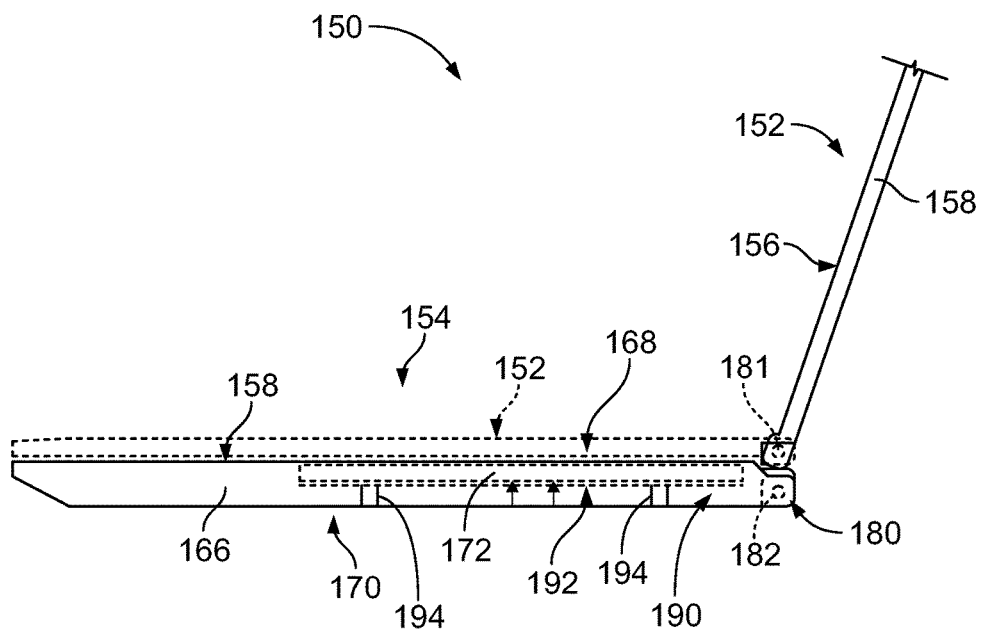
FIG. 2 is a side view of an electronic apparatus in accordance with an embodiment in which a display subassembly is in an opened position relative to a base subassembly.
Figure 3:
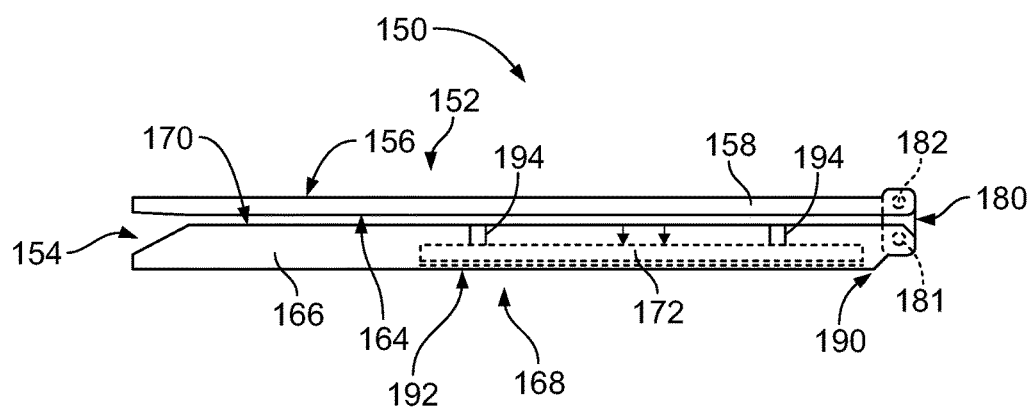
FIG. 3 is a side view of the electronic apparatus of FIG. 2 in which the display subassembly is in a tablet position relative to the base subassembly.

FIGS. 2 and 3 are side views of an electronic apparatus 150 that may be similar or identical to the electronic apparatus 100 (FIG. 1). For example, the electronic apparatus 150 includes a display subassembly 152 and a base subassembly 154. In the illustrated embodiment, the electronic apparatus 150 is a convertible portable computer. In FIG. 2, the electronic apparatus 150 is in a standard operating mode similar to a laptop personal computer (PC). The display subassembly 152 is turned to an angle position of about 90° to 150° relative to the base subassembly 154. In FIG. 3, the display subassembly 152 is in a tablet operation mode such that the display subassembly 152 is turned to about 360° relative to the base subassembly 154. In other embodiments, the electronic apparatus 150 is only capable of operating in the standard operating mode.

The display subassembly 152 includes a display device 156 and a housing 158. The housing 158 has a rear side 164. In the tablet operating mode shown in FIG. 3, the display subassembly 152 is positioned side-by-side with the base subassembly 154 such that the angle 1 is essentially 0° (or 360°). More specifically, the rear side 164 of the housing 158 is positioned side-by-side with a back side 170 of the base subassembly 154.

The base subassembly 154 includes a housing 166 that couples with the housing 158 of the display subassembly 152. The housing 166 forms at least part of the exterior surface of the base subassembly 154. The housing 166 has an input side 168 and the opposite back side 170. An input device 172 is disposed within the housing 166. The input device 172 includes an array of mechanical elements that are activated by a user. For example, the input device 172 may be a keyboard having an array of keys. In some embodiments, the keys include individual keycaps that are held by a mechanism and depressed by a user. In other embodiments, the keys include keycaps that are elastic domes. The elastic domes may collapse when pressed by the user. Alternatively or in addition to keycaps, the mechanical elements may be switches or buttons that are activatable by a user.

The display subassembly 152 and the base subassembly 154 are rotatably coupled to one another by a hinge 180, which may also be referred to as a hinge assembly. In the illustrated embodiment, the hinge 180 is a two-axis hinge capable of rotating about a first operating axis 181 and a second operating axis 182. To change configurations of the electronic apparatus 150, torque may be applied by the user to at least one of the display subassembly 152 or the base subassembly 154. For example, a user may grip the display subassembly 152 while the base subassembly 154 rests upon a surface and rotate the display subassembly 152 away from or toward the base subassembly 154. As another example, a user may grip the display subassembly 152 in one hand and the base subassembly 154 in the other hand and open the electronic apparatus 150 or close the electronic apparatus 150. As described herein, the torque applied by the user is converted into a force that changes the elevation of a support tray holding mechanical elements.

As described herein, the hinge 180 is operatively coupled to an elevation mechanism 190. The elevation mechanism 190 includes a support tray 192 that is disposed in the base subassembly 154 and that holds the mechanism elements (not shown). The elevation mechanism 190 may also include elevator guides 194. The elevation mechanism is responsive to torque (e.g., applied by the user) that changes the rotational orientation of the display subassembly 152 such that the elevation mechanism 190 lifts the support tray 192 when the display subassembly 152 is moved to an upright position (as shown in FIG. 2) and lowers the support tray 192 when the display subassembly is moved to a closed position. Optionally, the elevation mechanism 190 may lower the support tray 192 as the display subassembly 152 is moved to a tablet position.

Figure 4:
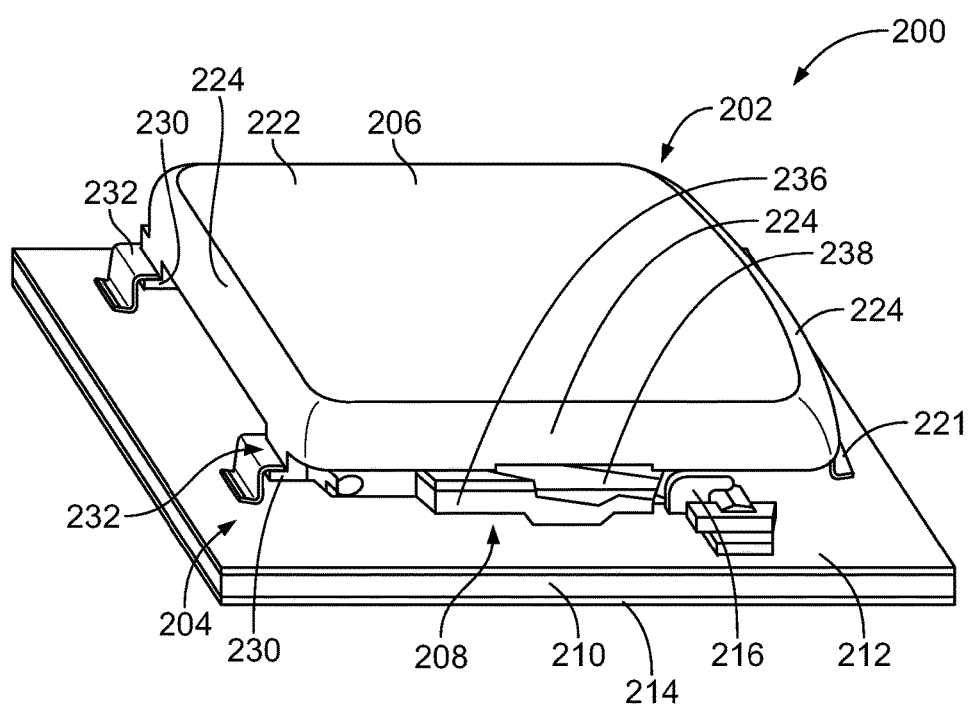
FIG. 4 is an enlarged view of a portion of an input device formed in accordance with an embodiment having a user-activatable mechanical element.

FIG. 4 is an enlarged perspective view of a portion of an input device 200 that includes a single user-activatable mechanical element 202. The mechanical element 202 may be combined with an array of other mechanical elements to form the input device 200. In particular embodiments, the input device 200 is a keyboard and the mechanical element 202 is a key of the keyboard. The mechanical element 202 may be activated by a depressing mechanism 204.

As shown, the mechanical element 202 includes a cap 206 that is supported by a guide mechanism 208. The guide mechanism 208 permits the cap 206 to be moved up or down. In the illustrated embodiment, the guide mechanism 208 includes first and second frames 236, 238 that rotatably engage each other in a scissors-like manner. The first and second frames 236, 238 collapse (as shown in FIG. 4) when the cap 206 is depressed.

Also shown, a support tray 210 holds the mechanical element 202. The support tray 210 may be considered a portion of the input device and/or a portion of the elevation mechanism. Optionally, the support tray 210 may include a membrane 212 that is positioned along a top side of the support tray 210. An opposite membrane 214 may be positioned along a bottom side of the support tray 210.

For some embodiments, the support tray 210 may be formed by cutting and raising or punching out a thin aluminum plate or the like into a metal plate. The support tray 210 may also be at least partially molded. In some embodiments, each and every user-activatable mechanical element of the electronic apparatus is supported by the support tray 210. In other embodiments, only some of the mechanical elements are supported by the support tray 210.

The mechanical elements 202 include hook-shaped locking pieces 216 that are positioned along the top side of the support tray 210 to mount the guide mechanism 208 thereon. The membrane 212 may be a three-layered switch sheet to close a contact when being pressed, for example, by a user.

The membrane 212 is laminated on the support tray 210. The membrane 212 closes the contact in such a manner that, when a position where a fixed contact and a moving contact overlap is pressed, the fixed contact and the moving contact engage each other. The membrane 212 has through holes everywhere, and the guide mechanism 208 is positioned on the top face of the support tray 210 through the through holes. Optionally, the membrane 212 may also be laminated under the support tray 210.

The cap 206 is positioned above the support tray 210 and operatively coupled to the guide mechanism 208. The cap 206 is coupled to one or more stoppers 221 that stop the cap 206 from being further depressed. Also shown, the cap 206 has a top face 222 and side faces 224. An inner space of the cap 206 is surrounded by the top face 222 and the side faces 224. At least a portion of the guide mechanism 208 may be positioned within the inner space.

The cap 206 also includes a plurality of guides 230. In the illustrated embodiment, the guides 230 are tabs that engage height limiters 232 of the input device. As the cap 206 is elevated to an inactivated position, the guides 230 slide along the height limiters 232 and are positively stopped by the height limiters 232. A biasing member (not shown), such as a rubber element or spring, is operatively coupled to the cap 206 and may lift the cap 206 when the user's finger is removed.

When the cap 206 is depressed, a designated area of the membrane 212 is engaged. The membrane 212 may be engaged by the cap 206 or by another element (e.g., biasing member) that is operatively coupled to the cap 206. When the cap 206 is released, the cap 206 returns to the original position (inactivated position) by a restoring force so that the membrane 212 will open the contact.

Figure 5:
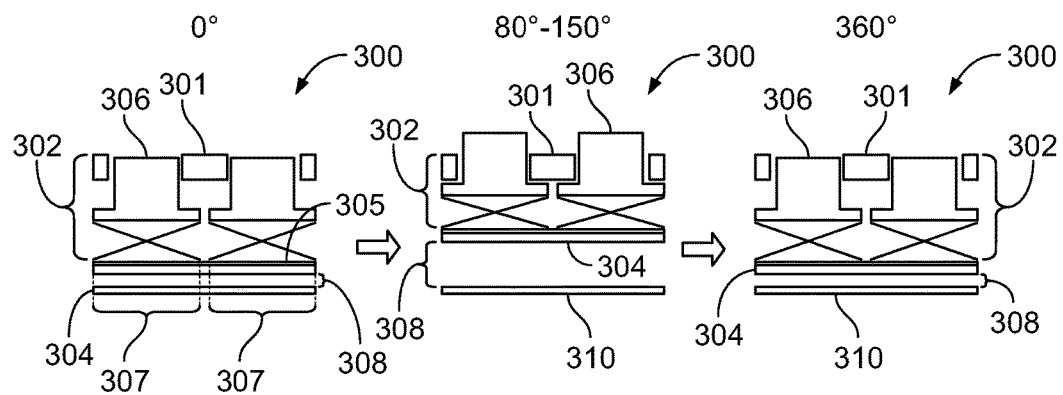
FIG. 5 is a schematic side view of a portion of an input device as an elevation mechanism moves the input device from a retracted position, to an elevated position, and back to the retracted position.

FIG. 5 is a schematic side view of a portion of an input device 300 that may be used by an electronic apparatus (not shown), such as the electronic apparatus 100 (FIG. 1). More specifically, FIG. 5 illustrates a support tray 304 that moves the input device 300 from a first retracted position, to an elevated position, and back to a second retracted position. The support tray 304 includes a membrane 305 having contacts therein. The membrane 305 communicates to the base subassembly when a designated area 307 of the membrane 305 has been engaged by a depressed (activated) cap 306.

The input device 300 includes an interstitial frame 301 having an array of openings through which caps 306 may move. The interstitial frame 301 may be a portion of the housing (not shown) of the electronic apparatus or may be separate from the housing. In the retracted position, the display subassembly (not shown) may have a rotational orientation that is about 0° with respect to the base subassembly. As shown, the top faces of the caps 306 of the mechanical elements 302 are substantially flush with the interstitial frame 301. In the retracted position, the support tray 304 has a lowered elevation. A gap 308 between the support tray 304 and a wall 310 exists. Optionally, the support tray 304 may interface with the wall 310 such that at most a small or nominal gap exists.

In response to the display subassembly being rotated to an opened position (e.g., such that the display subassembly is between 80°-150°), the support tray 304 may be raised, thereby lifting the mechanical elements 302. The input device 300 then has an elevated position. Also shown, in response to the display subassembly being rotated to a table position (e.g., such that the display subassembly is about 360° with respect to the base subassembly), the support tray 304 may be lowered, thereby retracting the mechanical elements 302. The input device 300 then has a second retracted position. In some embodiments, the input device 300 may have the same elevation in the first and second retracted positions. In other embodiments, however, the input device 300 may have a different elevation in the first retracted position than in the second retracted position.

As described herein, an elevation mechanism may lift or lower (e.g., retract) the mechanical elements 302 as a group. More specifically, an entire array of the mechanical elements 302 may be held by the support tray 304. The entire array may be lifted as group when the support tray 304 is raised such that each and every mechanical element 302 of the array moves at the same time. When the support tray 304 is raised, the gap 308 increases in size. When the support tray 304 is lowered, the gap 308 decreases in size.

Figure 6:
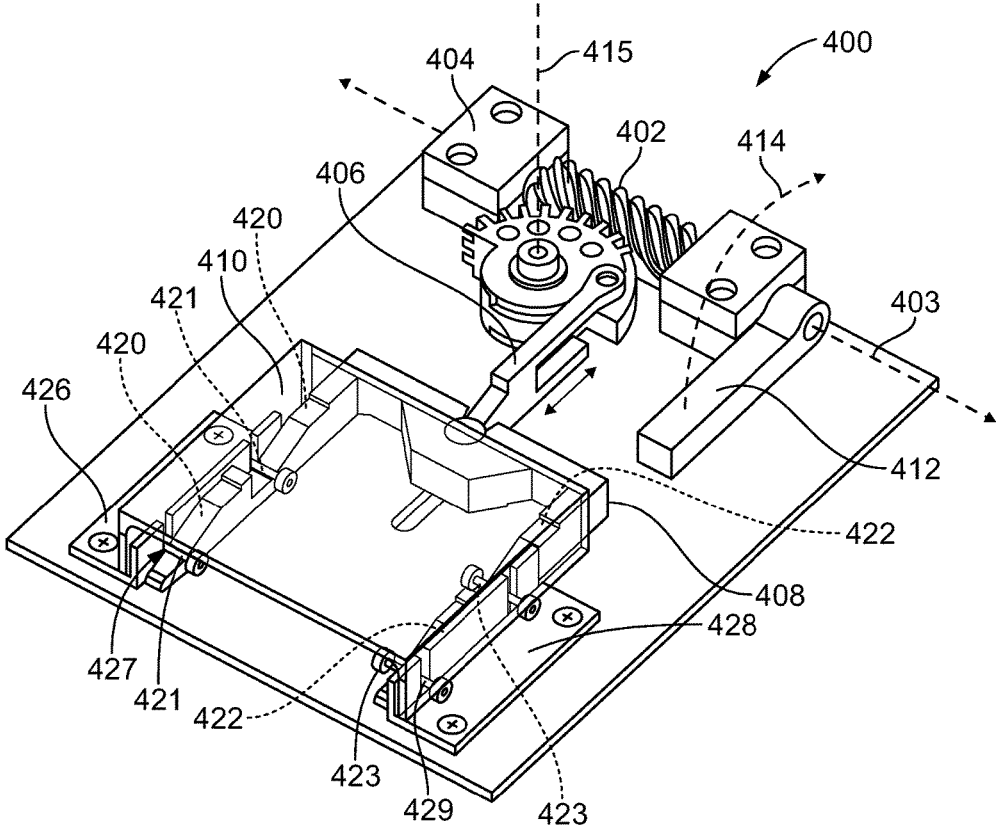
FIG. 6 is a perspective view of an elevation mechanism in accordance with an embodiment that may be used by the electronic apparatus of FIG. 1.

FIG. 6 is a perspective view of an elevation mechanism 400 in accordance with an embodiment that may be used by the electronic apparatus 100 (FIG. 1). The elevation mechanism 400 includes a first gear 402, a second gear 404, a linkage 406, a slider 408, and a support tray 410. As shown, the first gear 402 rotates about an operating axis 403. The operating axis 403 may be collinear with the operating axis (or one of the operating axes) of the electronic apparatus. The first gear 402 is secured to a lever 412. The lever 412 may form a portion of a display subassembly (not shown) or be secured directly or indirectly to a display subassembly, such as the display subassembly 102 (FIG. 1). In FIG. 6, the lever 412 has a position that correlates to a closed position of the display subassembly. When the display subassembly is rotated to an opened position, the lever 412 moves as indicated by an arrow 414.

The first gear 402 and the second gear 404 are operatively coupled (e.g., enmeshed) such that the first gear 402 causes the second gear 404 to rotate about a working axis 415. More specifically, the first and second gears 402, 404 may have respective teeth that are designed relative to one another. The first gear 402 may also be referred to as a pinion. As the lever 412 rotates about the operating axis 403, the first gear 402 rotates about the operating axis 403, thereby causing the second gear 404 to rotate about the working axis 415.

The second gear 404 is operatively coupled to the linkage 406 such that the linkage 406 moves when the second gear 404 rotates about the working axis 415. The linkage 406 is operatively coupled to the slider 408 such that a linear position of the slider 408 is based upon a rotational orientation of the second gear 404. The slider 408, in turn, is operatively coupled to the support tray 410. More specifically, the slider 408 has ramp surfaces 420, 422 that engage posts 421, 423, respectively. The posts 421, 423 are secured to the support tray 410. More specifically, the posts 421, 423 are secured to opposite sidewalls of the support tray 410. The elevator guides 426, 428 have slots 427, 429, respectively, that receive the posts 421, 423, respectively.

Accordingly, as the second gear 404 rotates about the working axis 415, the linkage 406 pushes or pulls the slider 408, thereby moving a linear position of the slider 408. Although the linkage 406 is rotatably coupled to the second gear 404, the linkage 406 is also rotatably coupled to the slider 408. The slider 408 is guided along a linear path by the elevator guides 426, 428. Based on the linear position of the slider 408, the posts 421, 423 will have a designated elevation determined by where the posts 421, 423 are located along the ramp surfaces 420, 422, respectively. The posts 421, 423, the elevator guides 426, 428, and the support tray 410 have fixed positions with respect to one another. Accordingly, an elevation of the support tray 410 is determined by the rotational orientation of the second gear 404, which is determined by the rotational orientation of the first gear 402, which is determined by the rotational orientation of the display subassembly.

Figure 7:
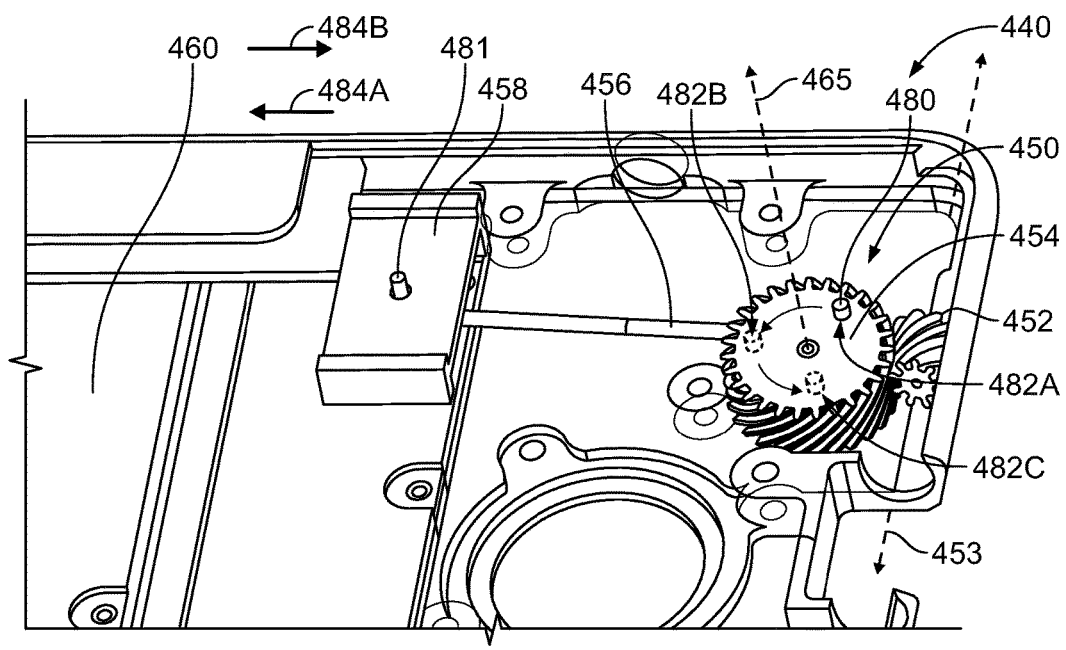
FIG. 7 is an enlarged view of an elevation mechanism in accordance with an embodiment that may be used by the electronic apparatus of FIG. 1.

FIG. 7 is an enlarged view of an elevation mechanism 450 of electronic apparatus 440, which may be similar or identical to the electronic apparatus 100 (FIG. 1). Only a portion of the electronic apparatus 440 is shown. The elevation mechanism 450 may include elements and features that are similar or identical to the elements and features of the elevation mechanism 400 (FIG. 6). For example, the elevation mechanism 450 includes a first gear 452, a second gear 454, a linkage 456, a slider 458, and a support tray 460. As shown, the first gear 452 rotates about an operating axis 453 that is collinear with an operating axis of the electronic apparatus.

The first gear 452 and the second gear 454 are operatively coupled (e.g., enmeshed) such that the first gear 452 causes the second gear 454 to rotate about a working axis 465. As the display subassembly rotates about the operating axis 453, the first gear 452 rotates about the operating axis 453, thereby causing the second gear 454 to rotate about the working axis 465. The second gear 454 is operatively coupled to the linkage 456 such that the linkage 456 moves when the second gear 454 rotates about the working axis 465. The linkage 456 is operatively coupled to the slider 458 such that a linear position of the slider 458 is based upon a rotational orientation of the second gear 454. The slider 458, in turn, is operatively coupled to the support tray 460. Although not shown, the slider 458 and the support tray 460 may operatively couple to one another in a manner that is similar to the elevation mechanism 400 (FIG. 6). For example, the elevation mechanism 450 may utilize elevator guides, posts, and ramp surfaces.

Unlike the elevation mechanism 400, the elevation mechanism 450 moves the support tray 460 between three different positions of the display assembly. More specifically, the elevation mechanism 450 may raise the support tray 460 as the display subassembly is rotated from a closed position to an opened position. The elevation mechanism 450 may lower the support tray 460 as the display subassembly is rotated from the opened position to a tablet position. Accordingly, in one stroke from the closed position to the tablet position, the support tray 460 is raised and then lowered and moves from a first retracted position, to an elevated position, and then to a second retracted position. The elevation mechanism 450 may move the support tray 460 in a reverse order as the display subassembly is rotated back to the opened position or back to the closed position.

To this end, the second gear 454 may move the linkage 456 for a tablet position of the display subassembly. An end segment 480 of the linkage 456 clears a surface of the second gear 454 such that the end segment 480 is visible. The end segment 480 is rotatably coupled to the gear 454. An opposite end segment 481 is rotatably coupled to the slider 458. A position of the end segment 480 may correspond to a rotational position of the second gear 454.

In FIG. 7, the linkage 456 and the second gear 454 are positioned as if the display subassembly is in the closed position. The end segment 480 has a first radial position 482A when the gear 454 has a first rotational position, and the support tray (not shown) has a first retracted elevation. As the display subassembly is rotated to an opened position, the second gear 454 is rotated such that the linkage 456 pushes the slider 458 in a first linear direction 484A. When the displays subassembly is in the opened position, the gear 454 has a second rotational position, the end segment 480 has a second radial position 482B, and the support tray (not shown) has an active elevation. As the display subassembly is rotated in the same direction to the tablet position, the second gear 454 is rotated in the same direction. However, the linkage 456 pulls the slider 458 in a second linear direction 484B, which is opposite the first linear direction 484A. When the displays subassembly is in the tablet position, the gear 454 has a third rotational position, the end segment 480 has a third radial position 482C, and the support tray (not shown) has a second retracted elevation.

As shown in FIG. 7, the gear 454 is rotated more than 180°. For example, the gear 454 is rotated about 240°. In some embodiments, the gear 454 is rotated at least 120° or, more particularly, at least 150°. In certain embodiments, the gear 454 is rotated at least 180° or, more particularly, at least 220°. In particular embodiments, the gear 454 is rotated at least 240° or, more particularly, at least 300°. In other embodiments, the gear 454 may be rotated less than 120°.

Figure 8:
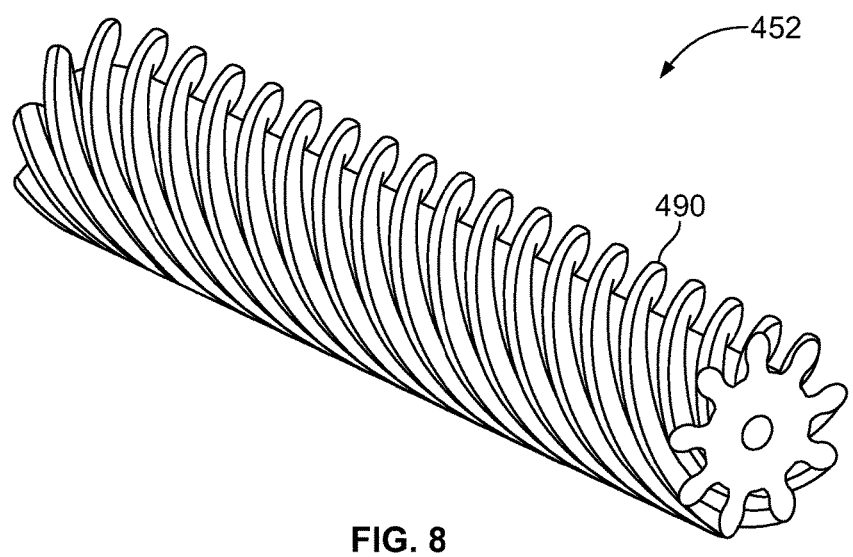
FIG. 8 is an isolated view of a gear that may be used by the elevation mechanism of FIG. 7.
Figure 9:
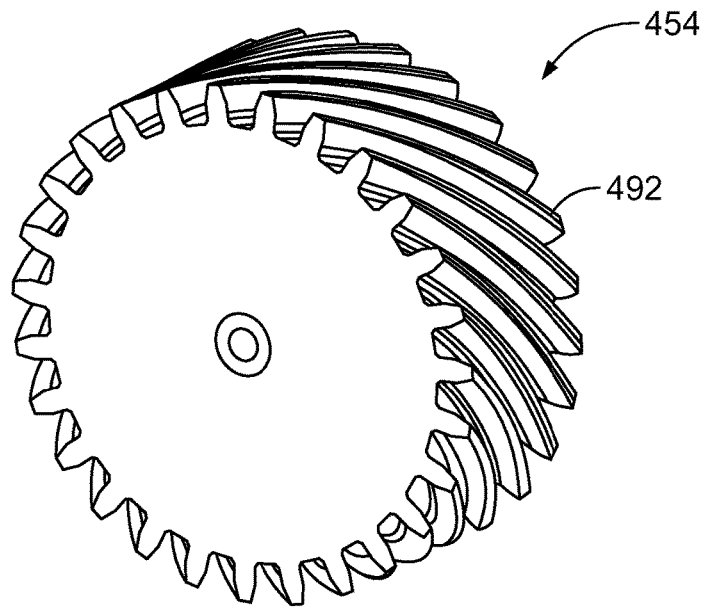
FIG. 9 is an isolated view of another gear that may be used by the elevation mechanism of FIG. 7.

FIG. 8 is an isolated view of the first gear 452 having teeth 490, and FIG. 9 is an isolated view of the second gear 454 having teeth 492. In particular embodiments, the first gear 452, which may also be referred to as a pinion, rotates about an axis that is collinear with the axis of rotation of the display subassembly. In some embodiments, the first gear 452 has a module that is 0.300-0.400. In some embodiments, the teeth 490 of the first gear 452 have an addendum that is between 0.300 millimeters (mm) and 0.600 mm. In some embodiments, the teeth 490 of the first gear 452 have a dedendum that is between 0.300 and 0.600 mm. The number of teeth 490 may be, for example, between six (6) and twelve (12). A pitch diameter may be between 2.8 mm and 3.3 mm. A pressure angle may be between 10 and 20°. A helix angle is 45°. A tip diameter may be at most 5.0 mm or, more particularly, at most 4.0 mm.

With respect to FIG. 9, in some embodiments, the second gear 454 has a module that is 0.300-0.400. In some embodiments, the teeth 492 of the second gear 454 have an addendum that is between 0.300 millimeters (mm) and 0.600 mm. In some embodiments, the teeth 492 of the second gear 454 have a dedendum that is between 0.300 and 0.600 mm. The number of teeth 492 may be, for example, between twenty (20) and thirty-five (35) or, more particularly, between twenty-five (25) and thirty (30). A pitch diameter may be between 8.0 mm and 12.0 mm or, more particularly, between 9.0 mm and 10.0 mm. A pressure angle may be between 10 and 20°. A helix angle is 45°. A tip diameter may be at most 20.0 mm or, more particularly, at most 15.0 mm, or yet more particularly, at most eleven (11.0) mm.

Figure 10:
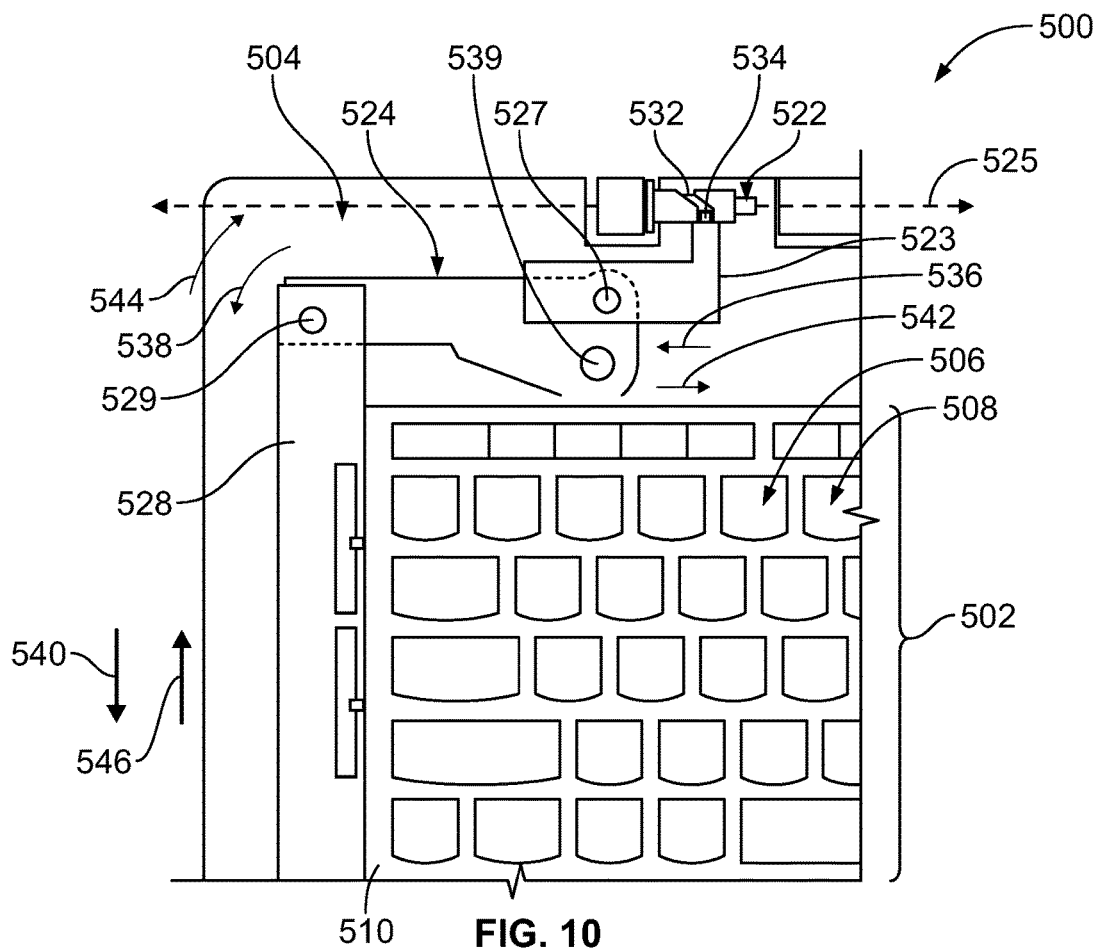
FIG. 10 illustrates a portion of an input device relative to an elevation mechanism in accordance with an embodiment.

FIG. 10 illustrates a portion of an electronic apparatus 500 that includes an input device 502 and an elevation mechanism 504. The input device 502 includes an array 506 of user-activatable mechanical elements 508, such as the user-activatable mechanical elements described herein. In the illustrated embodiment, the input device 502 is a keyboard and the mechanical elements 508 are keys or keycaps. The mechanical elements 508 are held by a support tray 510.

The elevation mechanism 504 may be similar or identical to the elevation mechanism 400 or the elevation mechanism 450. For example, the elevation mechanism 504 includes a gear 522, a linkage 523, a lever 524, and a slider 528. The elevation mechanism 504 also includes the support tray 510. In the illustrated embodiment, the gear 522 has a cam surface 532 (e.g., groove) that engages a post 534 of the linkage 523. The gear 522 is operatively coupled to a display subassembly, such as the display subassembly 102 (FIG. 1).

The gear 522 is responsive to a rotational orientation of the display subassembly. As the display subassembly is rotated, the gear 522 is rotated about an axis of rotation. The axis of rotation may be collinear with the operating axis 525 about which the display subassembly rotates. The gear 522 may be a cam and the linkage 523 may be a follower. As the gear 522 is rotated, the post 534 is moved in a linear manner. As such, when the display subassembly is rotating in a designated rotational direction, the gear 522 is also rotating in the same direction.

To illustrate the elevation mechanism 504, the cam surface 532 moves the linkage 523 as the gear 522 is rotated. The linkage 523 is rotatably coupled to the lever 524 at a linkage axis 527. When the linkage 523 is moved in a linear direction 536, the linkage 523 rotates the lever 524 in a rotational direction 538 about a lever axis 539. The lever axis 539 and the linkage axis 527 are perpendicular to the input side of the base subassembly (not shown). The lever 524 is rotatably coupled to the slider 528 such that the lever 524 and the slider 528 rotate relative to one another about a slider axis 529. When the lever 524 rotates in the rotational direction 538, the slider 528 is driven by the lever 524 in a linear direction 540.

As the display subassembly is rotated in a different direction, the gear 522 causes the linkage 523 to move in a linear direction 542 that is opposite the linear direction 536. The linkage 523 rotates the lever 524 in a rotational direction 544 that is opposite the rotational direction 538, which causes the lever 524 to drive the slider 528 in a linear direction 546 that is opposite the linear direction 540.

In either linear direction, the slider 528 may be designed to raise or lower the support tray 510. For example, as the slider 528 moves in the linear direction 540, the support tray 510 may be raised. As the slider 528 moves in the opposite linear direction 546, the support tray 510 may be lowered. In an alternative embodiment, as the slider 528 moves in the linear direction 540, the support tray 510 may be lowered. As the slider 528 moves in the opposite linear direction 546, the support tray 510 may be raised.

Figure 11:
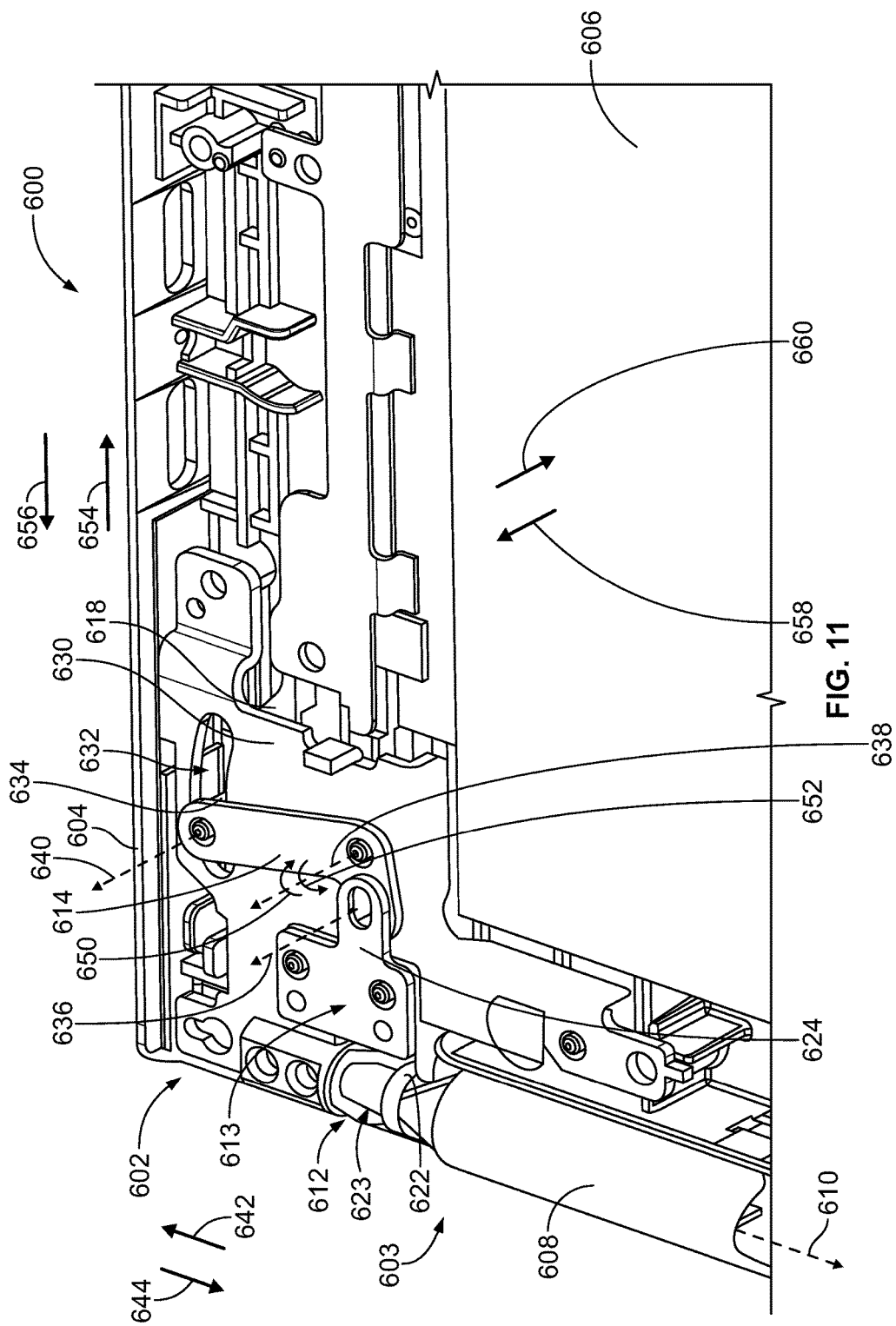
FIG. 11 is an enlarged view of a portion of an electronic apparatus illustrating an elevation mechanism in accordance with an embodiment.

FIGS. 11-14 illustrate an elevation mechanism 602 that may be similar or identical to the elevation mechanism 504 (FIG. 10). FIG. 11 is an enlarged view of a portion of an electronic apparatus 600 having a base subassembly 603 that includes a housing 604. A support tray 606 is disposed within the housing 604. Although not shown, the electronic apparatus 600 may also include a display subassembly (or cover subassembly) that is coupled to a hinge 608. The hinge 608 enables the display subassembly to rotate about an operating axis 610.

As shown, the elevation mechanism 602 includes a gear 612, a linkage 613, a lever 614, and a slider 618. The slider 618 is shown in greater detail in FIG. 12. With respect to FIG. 11, the linkage 613 includes an arm 622 and a plate 624. The arm 622 engages a cam surface 623 of the gear 612. The gear 612 is operatively coupled to a display subassembly (not shown) and rotates about the operating axis 610 when the display subassembly is moved.

Optionally, the elevation mechanism 602 may include a platform 630 that supports the lever 614 and the linkage 613. The platform 630 includes a slot 632 through which a linkage 634 of the elevation mechanism 602 may slide. More specifically, the linkage 634 operatively couples the lever 614 and the slider 618. The lever 614 is rotatably coupled to the linkage 613 and to the slider 618. The linkage 613 drives rotation of the lever 614 such that the lever 614 rotates relative to the linkage 613 about a linkage axis 636. In other words, the linkage 613 and the lever 614 are rotatably coupled about the linkage axis 636. When driven by the linkage 613, the lever 614 rotates about a lever axis 638. The lever 614, in turn, drives the slider 618. In particular, the lever 614 drives the slider 618 such that the lever 614 rotates relative to the slider 618 about a slider axis 640. In other words, the lever 614 613 and the slider 618 are rotatably coupled about the slider axis 640.

The linkage 613 moves in a linear direction 642 when the display subassembly is rotated to an opened position from a closed position. The linkage 613 moves in a linear direction 644 that is opposite the linear direction 642 when the display subassembly is rotated to the closed position from the opened position. Optionally, the cam surface 623 of the gear 612 may be shaped to move the linkage in the linear direction 644 when the display subassembly is rotated from the closed position to a tablet position.

The lever 614 rotates about the lever axis 638 in a rotational direction 650 when the linkage 613 is moved in the linear direction 642. The lever 614 rotates about the lever axis 638 in a rotational direction 652, which is opposite the rotational direction 650, when the linkage 613 is moved in the linear direction 644.

Figure 12:
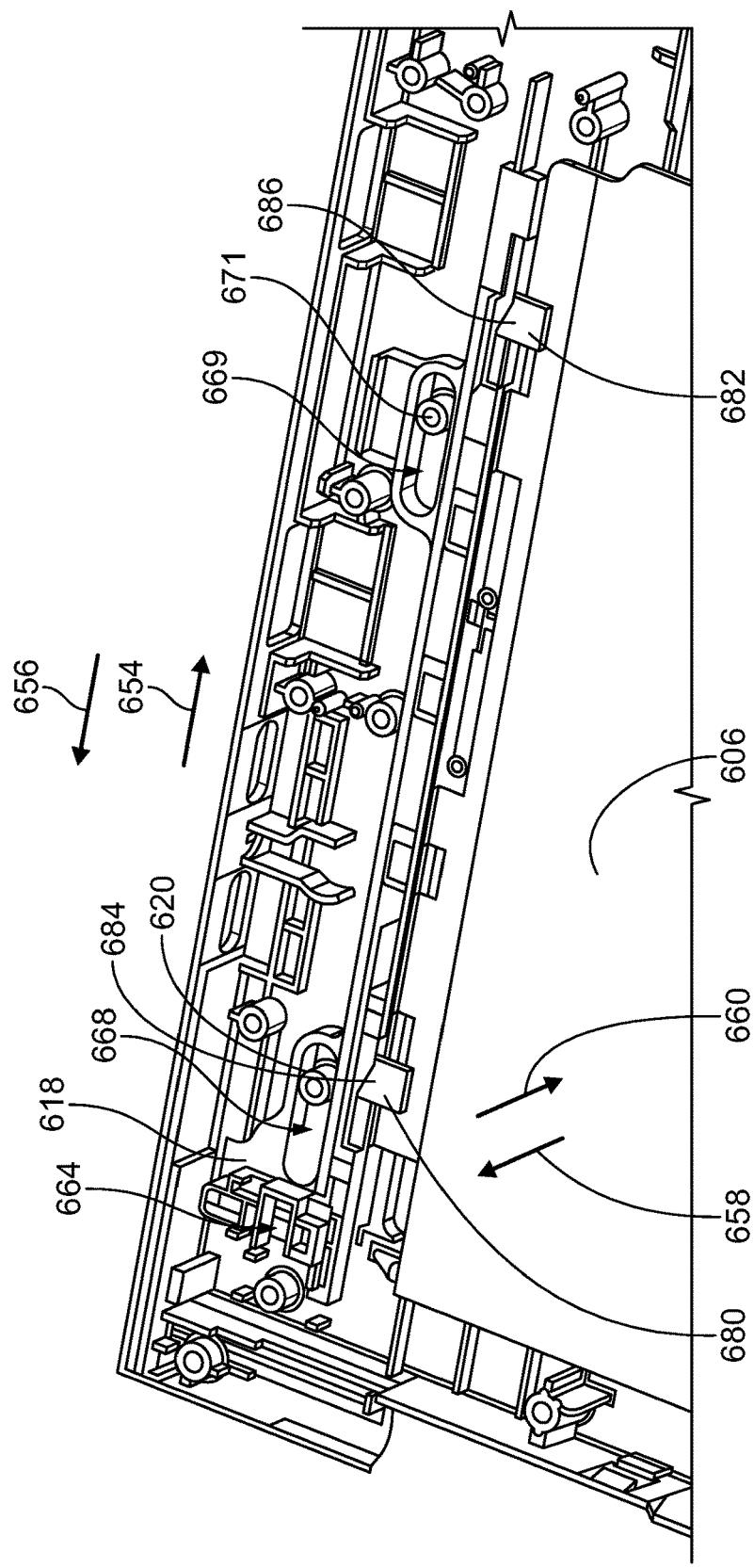
FIG. 12 is an exposed view of the portion of the electronic apparatus illustrating a slider that may be used by the elevation mechanism of FIG. 11.

With respect to FIG. 12, the linkage 634 (FIG. 11) may engage a port 664 of the slider 618. As shown, the slider 618 includes slots 668, 669 that receive guides 670, 671, respectively, of the housing 604. The slots 668, 669 and the guides 670, 671 interact to direct the slider 618 during activation. More specifically, the slider 618 is driven in a linear direction 654 when the lever 614 (FIG. 11) rotates in the rotational direction 650 (FIG. 11) and driven in an opposite linear direction 656 when the lever 614 rotates in the rotational direction 652 (FIG. 11).

The support tray 606 is secured to elevator guides 680, 682 and the slider 618 includes ramp surfaces 684, 686. The elevator guides 680, 682 slidably engage the ramp surfaces 684, 686, respectively. The ramp surfaces 684, 686 are shaped to raise and lower the elevator guides 680, 682 based on a direction of movement by the slider 618. Consequently, the support tray 606 is raised or moved based on the direction of movement of the slider 618. For example, in the illustrated embodiment, the support tray 606 is raised (as indicated by arrow 658) as the slider 618 moves in the linear direction 654 and lowered (as indicated by arrow 660) as the slider 618 is moved in the linear direction 656. In other embodiments, the support tray 606 is raised as the slider 618 moves in the linear direction 656 and lowered as the slider 618 is moved in the linear direction 654.

Figure 13:
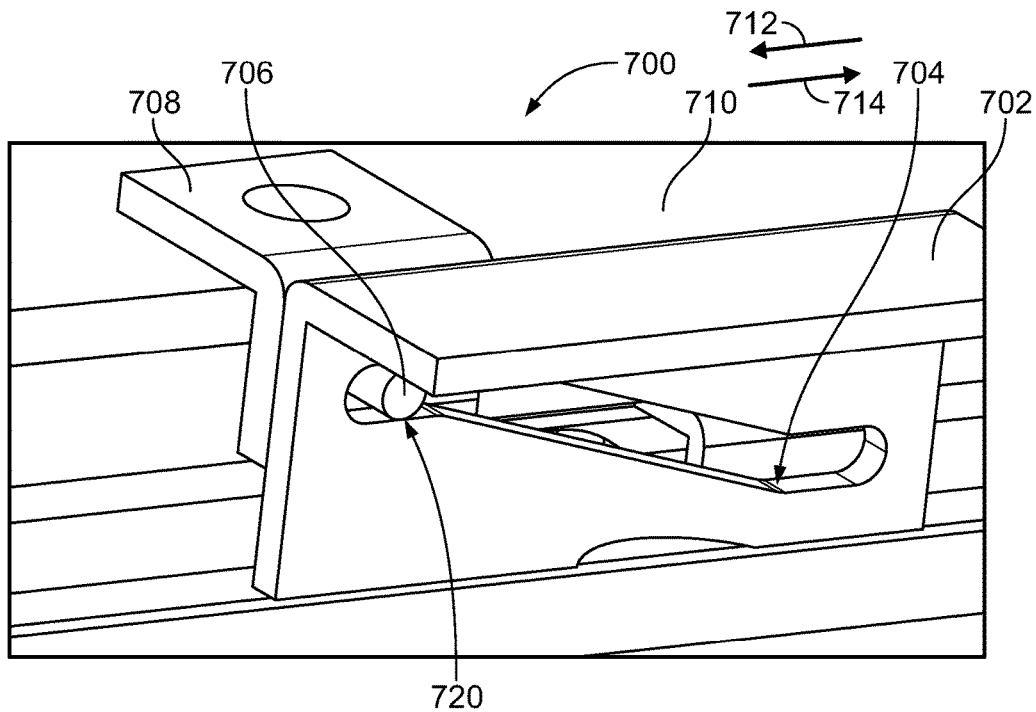
FIG. 13 is an enlarged view of a portion of an elevation mechanism that includes an elevator guide having a ramp surface in accordance with an embodiment.
Figure 14:
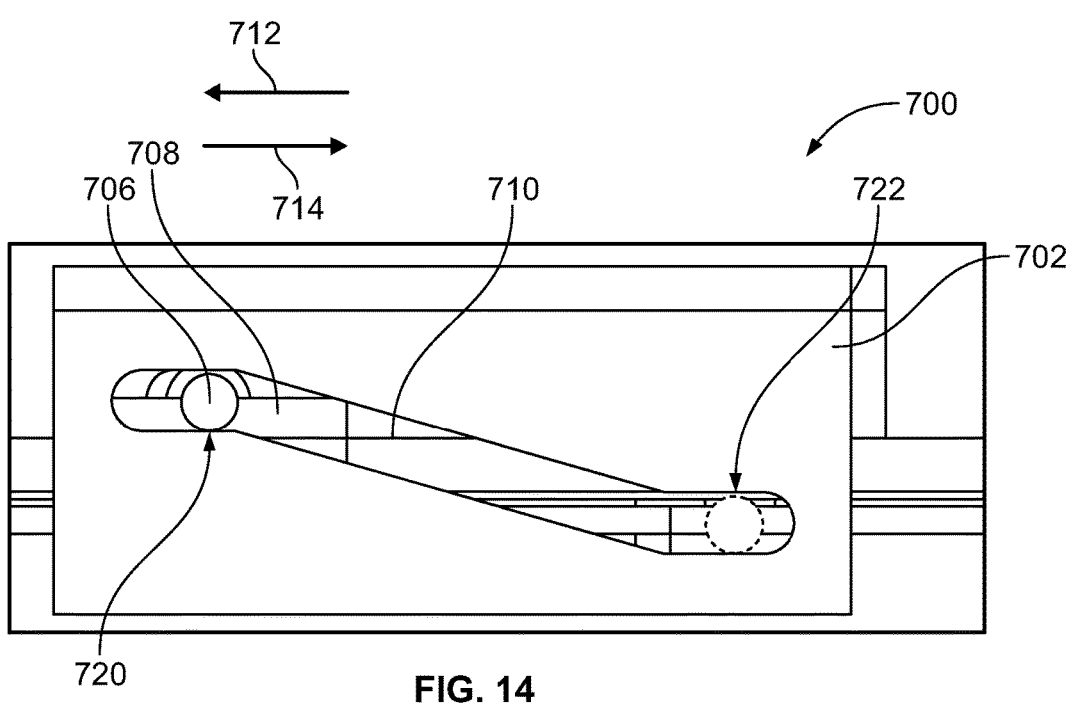
FIG. 14 is a side view of the elevator guide of FIG. 13.

FIGS. 13 and 14 illustrate a portion of an elevation mechanism 700 that includes an elevator guide 702 having a ramp surface 704. The elevator guide 702 may be incorporated into the other elevation mechanisms described herein. For example, the slider 618 (FIG. 12) may include the elevator guide 702.

The elevation mechanism 700 also includes a camming element 706 that is secured to a tab 708 that, in turn, is secured to a support tray 710. The camming element 706 has a fixed position with respect to the support tray 710. In some embodiments, the elevator guide 702 may be translated in a linear direction 712 or translated in an opposite linear direction 714. The camming element 706 may have a first position 720 or a second position 722 (shown by dashed lines in FIG. 14).

With the camming element 706 in the first position 720, the elevator guide 702 may be translated in the linear direction 712. The camming element 706 slides down the ramp surface 704 as the elevator guide 702 moves, thereby lowering the support tray 710. With the camming element 706 in the second position, the elevator guide 702 may be translated in the linear direction 714. The camming element 706 slides up the ramp surface 704, thereby raising the support tray 710.

In other embodiments, the support tray 710 may be translated in the linear direction 712 or translated in the opposite linear direction 714. For example, the various gears and linkages describe herein may directly move the support tray 710 in either of the linear directions 712, 714. Accordingly, with the camming element 706 in the first position 720, the support tray 710 may be translated in the linear direction 714. The camming element 706 slides down the ramp surface 704 as the support tray 710 moves, thereby lowering the support tray 710. With the camming element 706 in the second position, the support tray 710 may be translated in the linear direction 712. The camming element 706 slides up the ramp surface 704, thereby raising the support tray 710.

Figure 15:
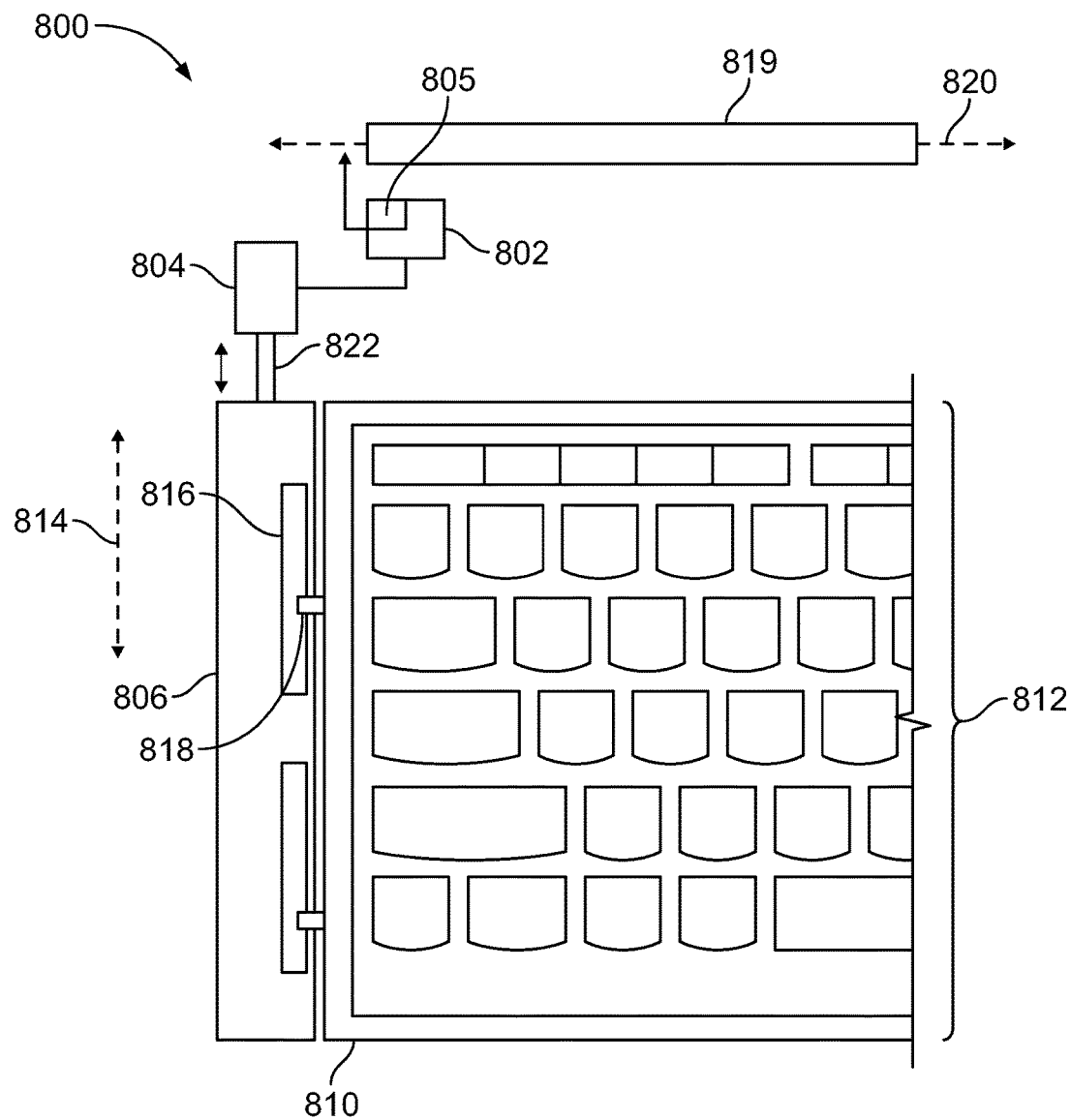
FIG. 15 is a schematic view of an elevation mechanism formed in accordance with an embodiment.

FIG. 15 is a schematic view of an elevation mechanism 800 in accordance with an embodiment. The elevation mechanism 800 includes a slider 806. The elevation mechanism 800 may lift or lower a support tray 810 holding an input device 812. For example, the elevation mechanism 800 may move the slider 806 back-and-forth in opposite linear directions along a sliding axis 814. As described herein, the slider 806 may include one or more ramp surfaces 816 that engage camming elements 818 that are affixed to the support tray 810. The camming elements 818 may slide along the ramp surfaces 816.

In some embodiments, the elevation mechanism 800 is physically or mechanically separate from the display subassembly. For example, the elevation mechanism 800 may include a sensor 802 and a motor 804 that is operatively coupled to the sensor 802. The sensor 802 may have, for example, a rotary encoder 805 that determines a rotational orientation of the displays subassembly. For example, the rotary encoder 805 may convert an angular position or motion of a rotating element to an analog or digital signal. The rotary encoder 805 may be an absolute encoder or an incremental encoder. Output of absolute encoders indicates a current position of the rotating element. Output of incremental encoders provides information about the motion of the rotating element, which may be processed to determine the rotational orientation.

In the illustrated embodiment, the display subassembly is secured to an axle 819. As the display subassembly is rotated about an operating axis 820, the axle 819 also rotates about the operating axis 820. The rotary encoder 805 may determine the rotational orientation of the display subassembly based on the rotational orientation of the axle 819. The sensor 802 may communicate instructions to the motor 804 that are based on the rotational orientation. The motor 804 may drive a linkage 822 (e.g., rod) back and forth in response to instructions to move the slider 806. As such, the motor 804 may lift or lower the support tray 810 in response to the rotational orientation of the display subassembly being changed. For instance, the linkage 822 of the motor 804 may push or pull the slider 806 along the axis 814, thereby changing an elevation of the support tray 810.

As appreciated by one skilled in the art, various aspects may be embodied as a system, method, or computer (device) program product. Accordingly, aspects may take the form of an entirely hardware embodiment or an embodiment including hardware and software that may all generally be referred to herein as a "circuit," "module" or "system."

Program code embodied on a storage medium may be transmitted using any appropriate medium, including but not limited to, wireless, wireline, optical fiber cable, RF, et cetera, or any suitable combination of the foregoing. Program code for carrying out operations may be written in any combination of one or more programming languages. The program code may execute entirely on a single device, partly on a single device, as a stand-alone software package, partly on single device and partly on another device, or entirely on the other device.

Aspects are described herein with reference to the figures, which illustrate example methods, devices, and program products according to various example embodiments. Program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic apparatus comprising:
   a base subassembly having an input side, the base subassembly including an input device that includes an interstitial frame and an array of mechanical elements movable within the interstitial frame and positioned along the input side, the mechanical elements to be pressed;
   a display subassembly including a display device that visually presents information;
   one or more processors and memory to store program instructions accessible by the one or more processors, wherein, responsive to execution of the program instructions, the processor to present information through the display device; and
   a hinge rotatably coupling the base subassembly and the display subassembly, the hinge to allow the base subassembly and the display subassembly to rotate about an operating axis to change a rotational orientation of the display subassembly relative to the base subassembly; and
   an elevation mechanism operatively coupled to the hinge, the elevation mechanism including a support tray disposed in the base subassembly that holds the mechanical elements, the elevation mechanism being responsive to torque that changes the rotational orientation of the display subassembly such that the elevation mechanism to lift the support tray to a lifted position relative to the interstitial frame when the display subassembly is moved to an upright position and to lower the support tray to a retracted position relative to the interstitial frame when the display subassembly is moved to a closed position.

2. The electronic apparatus of claim 1, wherein the elevation mechanism includes a gear and a slider that is operatively coupled to the gear, the gear rotating as the rotational orientation of the display subassembly is changed, the gear to cause the slider to move as the gear rotates, and wherein the elevation mechanism also includes elevator guides to lift the support tray when the display subassembly is moved to an upright position and to lower the support tray when the display subassembly is moved to a closed position.

3. The electronic apparatus of claim 1, wherein the electronic apparatus is a portable computer operable in a standard mode and in a tablet mode, the elevation mechanism lowering the support tray from an active elevation to a retracted elevation in response to the display subassembly being rotated from an opened position to a tablet position.

4. The electronic apparatus of claim 1, wherein the elevation mechanism includes a sensor and a motor operatively coupled to the sensor, the sensor having a rotary encoder that determines the rotational orientation of the display subassembly, the motor lifting or lowering the support tray in response to the rotational orientation being changed.

5. The method of claim 1, wherein the support tray supplies a first restoring force to the mechanical elements when the mechanical elements are in the lifted position relative to the interstitial frame and a reduced second restoring force to the mechanical elements when the mechanical elements are in the retracted position relative to the interstitial frame.

6. The method of claim 1, wherein in the lifted position the mechanical elements extend above the interstitial frame, and in the retracted position the mechanical elements are flush with a surface of the interstitial frame or are below the surface of the interstitial frame.

7. An electronic apparatus comprising:
a cover subassembly;
a base subassembly having an input side and including an input device that includes an interstitial frame and an array of user-activatable mechanical elements movable within the interstitial frame and positioned along the input side;
a hinge rotatably coupling the base subassembly and the cover subassembly, the hinge to allow the base subassembly and the cover subassembly to rotate about an operating axis to change a rotational orientation of the cover subassembly relative to the base subassembly, the cover subassembly to cover the input side when the cover subassembly is in a closed position; and
an elevation mechanism operatively coupled to the hinge, the elevation mechanism including a support tray disposed in the base subassembly to hold the mechanical elements, the elevation mechanism being responsive to torque that changes the rotational orientation of the cover subassembly, the elevation mechanism to:
lift the support tray from a retracted elevation to an active elevation in response to the cover subassembly being moved to an opened position to lift the user-activatable mechanical elements to a lifted position relative to the interstitial frame; and
lower the support tray from the active elevation to a retracted elevation when the cover subassembly is moved to a closed position to lower the user-activatable mechanical elements to a retracted position relative to the interstitial frame.

8. The electronic apparatus of claim 7, wherein the elevation mechanism includes a gear and a slider that is operatively coupled to the gear, the gear to rotate as the rotational orientation of the display subassembly is changed, the gear to cause the slider to move as the gear rotates; wherein the slider includes a ramp surface to lift the support tray and lower the support tray.

9. The electronic apparatus of claim 8, wherein the gear comprises collinear with the operating axis such that the gear rotates about the operating axis.

10. The electronic apparatus of claim 9, wherein the gear is a pinion and the elevation mechanism further comprises a second gear that operatively couples the pinion and the slider, the pinion having a tip diameter that is at most five (5) millimeters.

11. The electronic apparatus of claim 7, wherein the electronic apparatus is a portable computer operable in a standard mode and in a tablet mode, the elevation mechanism lowering the support tray from an active elevation to a retracted elevation in response to the display subassembly being rotated from an opened position to a tablet position.

12. The electronic apparatus of claim 7, wherein the elevation mechanism includes a sensor and a motor operatively coupled to the sensor, the sensor having a rotary encoder that determines the rotational orientation of the display subassembly, the motor lifting or lowering the support tray in response to the rotational orientation being changed.

13. The method of claim 7, wherein the support tray supplies a first restoring force to the user-activatable mechanical elements when the user-activatable mechanical elements are in the lifted position relative to the interstitial frame and a reduced second restoring force to the mechanical elements when the user-activatable mechanical elements are in the retracted position relative to the interstitial frame.

14. The method of claim 7, wherein in the lifted position the user-activatable mechanical elements extend above the interstitial frame, and in the retracted position the user-activatable mechanical elements are flush with a surface of the interstitial frame or are below the surface of the interstitial frame.

15. A method comprising:
rotating a display subassembly of an electronic apparatus about an operating axis, the display subassembly being rotatably coupled to a base subassembly of the electronic apparatus, the base subassembly having a support tray holding an input device that includes an interstitial frame and user-activatable mechanical elements movable relative to the interstitial frame; wherein:
the support tray is raised by an elevation mechanism as the display subassembly is rotated from a closed position to an opened position to lift the user-activatable mechanical elements to a lifted position relative to the interstitial frame;
the support tray is lowered by the elevation mechanism as the display subassembly is rotated from the opened position to the closed position to lower the user-activatable mechanical elements to a retracted position relative to the interstitial frame;
the support tray is lowered by the elevation mechanism as the display subassembly is rotated from the opened position to a tablet position to lower the user-activatable mechanical elements to the retracted position relative to the interstitial frame.

16. The method of claim 15, further comprising moving a slider in a first linear direction or in a second linear direction as the display subassembly is rotated, the slider raising or lowering the support tray while moving in the first linear direction and in the second linear direction, respectively wherein the slider includes a ramp surface to raise the support tray and lower the support tray.

17. The method of claim 15, wherein the electronic apparatus includes a pinion that is collinear with the operating axis, the pinion rotating as the display subassembly is rotated, the pinion having a tip diameter that is at most five (5) millimeters.

18. The method of claim 17, wherein the electronic apparatus includes a gear that is operatively coupled to the pinion, wherein, as the gear rotates at least 150° in one direction, the support tray is raised and lowered.

19. The method of claim 15, wherein the support tray supplies a first restoring force to the user-activatable mechanical elements when the user-activatable mechanical elements are in the lifted position relative to the interstitial frame and a reduced second restoring force to the user-activatable mechanical elements when the user-activatable mechanical elements are in the retracted position relative to the interstitial frame.

20. The method of claim 15, wherein in the lifted position the user-activatable mechanical elements extend above the interstitial frame, and in the retracted position the user-activatable mechanical elements are flush with a surface of the interstitial frame or are below the surface of the interstitial frame.

\* \* \* \* \*